(12) United States Patent
Cosley et al.

(10) Patent No.: US 11,662,049 B2
(45) Date of Patent: *May 30, 2023

(54) TEST VALVE ASSEMBLY WITH EXTRACTION MECHANISM

(71) Applicant: Reliance Worldwide Corporation, Atlanta, GA (US)

(72) Inventors: James W. Cosley, Poway, CA (US); Jacob T. Chase, Poway, CA (US)

(73) Assignee: RELIANCE WORLDWIDE CORPORATION, Atlanta, GA (US)

(*) Notice: Subject to any disclaimer, the term of this patent is extended or adjusted under 35 U.S.C. 154(b) by 27 days.

This patent is subject to a terminal disclaimer.

(21) Appl. No.: 17/484,676

(22) Filed: Sep. 24, 2021

(65) Prior Publication Data

US 2022/0082195 A1 Mar. 17, 2022

Related U.S. Application Data

(63) Continuation of application No. 16/598,310, filed on Oct. 10, 2019, now Pat. No. 11,156,318.

(60) Provisional application No. 62/744,394, filed on Oct. 11, 2018.

(51) Int. Cl.
  *F16L 55/11* (2006.01)
  *G01M 3/02* (2006.01)
  *G01N 3/12* (2006.01)

(52) U.S. Cl.
  CPC ............. *F16L 55/11* (2013.01); *G01M 3/022* (2013.01); *G01N 3/12* (2013.01)

(58) Field of Classification Search
  CPC ........ F16L 55/105; F16L 55/11; F16L 55/1108; G01M 3/022; G01N 3/12
  See application file for complete search history.

(56) References Cited

U.S. PATENT DOCUMENTS

| | | |
|---|---|---|
| 1,054,150 A | 2/1913 | Thorsby |
| 1,133,714 A | 3/1915 | Elder |
| 1,161,997 A | 11/1915 | Thompson |
| 1,206,469 A | 11/1916 | Rockwell |
| 1,357,974 A | 11/1920 | Gorman |
| 1,928,316 A | 9/1933 | Muto |
| 1,933,182 A | 10/1933 | Pagon et al. |

(Continued)

FOREIGN PATENT DOCUMENTS

| | | |
|---|---|---|
| JP | 5099348 A | 4/1993 |
| SU | 1610178 A1 | 11/1990 |
| WO | 0101101 A1 | 1/2001 |

*Primary Examiner* — Erika J. Villaluna
(74) *Attorney, Agent, or Firm* — Barnes & Thornburg LLP (57) ABSTRACT

A pipeline has a fitting with a wedge-shaped plug pressed into a wedge-shaped fitting recess by a retaining ring to block flow through the fitting for pressure testing. The plug has an extractor plate fastened to the plug through a center of the retaining ring so the retaining ring can rotate relative to the plug and extractor plate. But the extractor plate is a predetermined maximum distance from the plug and is larger than the center opening of the retaining ring to captivate the retaining ring between the plug and extractor plate. That limits the retaining ring motion along the port's axis. Threading engagement between the retaining ring and port allow the retaining ring to push the plug into the fitting in a first rotation direction while rotation in the opposite direction allows the retaining ring to push the extractor plate and the connected plug out of the fitting.

20 Claims, 5 Drawing Sheets

(56) References Cited

U.S. PATENT DOCUMENTS

| | | |
|---|---|---|
| 2,031,155 A | 2/1936 | Eulberg |
| 2,616,655 A | 11/1952 | Hamer |
| 2,636,713 A | 4/1953 | Hamer |
| 2,701,117 A | 2/1955 | Bashark |
| 2,815,187 A | 12/1957 | Hamer |
| 2,823,887 A | 2/1958 | Osinski |
| 2,828,146 A | 3/1958 | Abbey |
| 2,845,954 A | 8/1958 | Hamer |
| 2,946,349 A | 7/1960 | Hamer |
| 2,953,015 A | 9/1960 | Carrie |
| 3,051,201 A | 8/1962 | Wilson |
| 3,069,132 A | 12/1962 | Grove |
| 3,232,577 A | 2/1966 | Sargent |
| 3,316,929 A | 5/1967 | Milette |
| 3,319,661 A | 5/1967 | Shindler |
| 3,333,814 A | 8/1967 | Sargent |
| 3,350,056 A | 10/1967 | Blumenkranz |
| 3,737,180 A | 6/1973 | Hayes, Jr. et al. |
| 3,770,301 A | 11/1973 | Adams |
| 3,844,531 A | 10/1974 | Grengs |
| 3,860,038 A | 1/1975 | Forni |
| 3,941,349 A | 3/1976 | Pierson |
| 3,945,604 A | 3/1976 | Clarkson |
| 4,007,911 A | 2/1977 | Clarkson |
| 4,019,371 A | 4/1977 | Chaplin et al. |
| 4,112,969 A | 9/1978 | Still |
| 4,125,231 A | 11/1978 | Ahlstone |
| 4,176,756 A | 12/1979 | Sellman |
| 4,194,721 A | 3/1980 | Nachtigahl |
| 4,225,115 A | 9/1980 | Miller |
| 4,271,870 A | 6/1981 | Butler et al. |
| D262,133 S | 12/1981 | Fain |
| 4,343,332 A | 8/1982 | Williams, 3rd et al. |
| 4,407,171 A | 10/1983 | Hasha et al. |
| 4,429,568 A | 2/1984 | Sullivan |
| 4,452,278 A | 6/1984 | Quinn |
| 4,456,026 A | 6/1984 | Kantor |
| 4,479,670 A | 10/1984 | Gabler |
| 4,522,224 A | 6/1985 | Stalder et al. |
| 4,531,710 A | 7/1985 | Tort |
| 4,602,504 A | 7/1986 | Barber |
| 4,643,226 A | 2/1987 | Balz |
| 4,763,510 A | 8/1988 | Palmer |
| 4,765,361 A | 8/1988 | Clifford |
| 4,795,197 A | 1/1989 | Kaminski et al. |
| 4,819,974 A | 4/1989 | Zeidler |
| 4,895,181 A | 1/1990 | McKavanagh |
| 4,944,484 A | 7/1990 | Hostetler |
| 4,949,939 A | 8/1990 | Almada |
| 5,004,210 A | 4/1991 | Sarno |
| 5,018,768 A | 5/1991 | Palatchy |
| 5,076,095 A | 12/1991 | Erhardt |
| 5,195,722 A | 3/1993 | Bedner |
| 5,197,324 A | 3/1993 | Keys |
| 5,232,199 A | 8/1993 | Thrasher |
| 5,269,568 A | 12/1993 | Courturier |
| 5,287,730 A | 2/1994 | Condon |
| 5,385,373 A | 1/1995 | Love |
| 5,445,359 A | 8/1995 | Beson |
| 5,464,035 A | 11/1995 | Heinecke |
| 5,494,079 A | 2/1996 | Tiedemann |
| 5,524,663 A | 6/1996 | Walsh et al. |
| 5,653,423 A | 8/1997 | Young et al. |
| 5,678,802 A | 10/1997 | Lunder |
| 5,707,089 A | 1/1998 | Fend |
| 5,782,499 A | 7/1998 | Gfrerer et al. |
| 6,000,278 A | 12/1999 | Hystad |
| D430,482 S | 9/2000 | Stout, Jr. |
| 6,131,441 A | 10/2000 | Berube et al. |
| 6,234,007 B1 | 5/2001 | Pampinella |
| 6,299,216 B1 | 10/2001 | Thompson |
| D451,984 S | 12/2001 | Tigerholm |
| 6,422,064 B1 | 7/2002 | Pampinella |
| 6,655,413 B2 | 12/2003 | Condom et al. |
| 6,672,139 B2 | 1/2004 | Pampinella |
| D488,852 S | 4/2004 | Pampinella |
| 6,997,041 B1 | 2/2006 | Metzger et al. |
| 7,325,442 B1 | 2/2008 | Pampinella et al. |
| 7,398,675 B1 | 7/2008 | Metzger et al. |
| 8,141,826 B1 | 3/2012 | Gallardo et al. |
| 8,887,768 B2 | 11/2014 | Hart et al. |
| 9,964,461 B2 | 5/2018 | Hart et al. |
| 2001/0015092 A1 | 9/2001 | Pampinella |
| 2002/0023482 A1 | 2/2002 | Pampinella |
| 2002/0140222 A1 | 10/2002 | Pampinella |
| 2004/0134260 A1 | 7/2004 | Pampinella et al. |
| 2004/0134261 A1 | 7/2004 | Pampinella |
| 2008/0083267 A1 | 4/2008 | Pampinella et al. |
| 2016/0370249 A1 | 12/2016 | Hart et al. |

TEST VALVE ASSEMBLY WITH EXTRACTION MECHANISM

CROSS-REFERENCE TO RELATED APPLICATIONS

The application is a continuation of U.S. patent application Ser. No. 16/598,310, filed Oct. 10, 2019, now U.S. Pat. No. 11,156,318; which claims the benefit of U.S. Provisional Patent Application No. 62/744,394, filed Oct. 11, 2018, the entire disclosures of which are incorporated herein by reference.

STATEMENT RE: FEDERALLY SPONSORED RESEARCH/DEVELOPMENT

Not Applicable

BACKGROUND

Various gate valves have been used to temporarily block flow through pipelines and conduits, with the gate valves being removed for various purposes. Early valves used flat sheets inserted through a port in the side of a pipe fitting, as in U.S. Pat. Nos. 5,287,730, 6,655,413, 6,997,041 and 6,234,007. Later versions used wedge-shaped valve bodies sealing against inclined sides in the fitting to block flow through the pipe fitting, as reflected by U.S. Pat. Nos. 8,141,826, 8,210,029 and 8,887,768. In order to hold the valve bodies in place in the fittings, a threaded retainer cap engaged the port through which the valve body was inserted. When pressure testing using these valves was completed, the retainer cap was removed and then the valve body was removed. Unfortunately, some of the valve bodies may wedge so tightly into the receiving walls of the pipe fitting that it is difficult to manually pull the valve bodies out of the fittings. This wedging and the resulting large removal force are believed especially pronounced on pipes larger than about four inches in diameter. The inability to manually remove the valve bodies limits the use of these devices on larger diameter pipes. There is thus a need for an improved way to remove flow valve bodies from fittings that is easier, faster and safer than the prior art. There is a further need to simplify the removal process and allow manual removal of the valve bodies from fittings that is easier, faster and safer than the prior art.

Prior art valves have used elongated linkages and screw shafts that extend a length that is greater than the diameter of the flow passage through the pipe, to extract the valve body completely from the fitting, and to sometimes insert another valve body into the fitting that filled the gap left by the valve body while having an opening to allow flow through the fitting. Such devices are illustrated by U.S. Pat. Nos. 2,845,954, 2,908,480, and 4,007,911. But these extraction mechanisms extend laterally from the pipe fittings a considerable distance and that subjects them to risk of damage and exposes the extraction mechanisms to the elements which will impair operation over time. Additionally, the cost of materials and labor to form these extended extraction mechanisms is considerable and the increased size limits on the usefulness of the valve mechanism. There is a need to simplify the manually operated removal process and allow removal of valve bodies from fittings in a less complex and simpler and more compact manner. All of the above needs are especially applicable for larger diameter pipes of four to about 12 inches in diameter.

BRIEF SUMMARY

A pipeline has a fitting with a wedge-shaped plug pressed into a wedge-shaped fitting recess by a retaining ring to block flow through the fitting for pressure testing. The plug has an extractor plate fastened to the plug through a center of the retaining ring so the retaining ring can rotate relative to the plug and extractor plate. The extraction plate is preferably parallel to the retaining ring. But the extractor plate is a predetermined maximum distance from the plug and is larger than the center opening of the retaining ring to captivate the retaining ring between the plug and extractor plate. That limits the retaining ring motion along the port's axis. Threading engagement between the retaining ring and port allow the retaining ring to push the plug into the fitting in a first rotation direction while rotation in the opposite direction allows the retaining ring to push the extractor plate and the connected plug out of the fitting.

There is thus provided a plug assembly for pressure testing a pipe line that has a fitting with a longitudinal fitting axis and a flow passage through the fitting along that longitudinal axis. The fitting has a circular port centered on a port axis orthogonal to and intersecting the longitudinal axis. The fitting also has port threads encircling the port axis and a first annular shoulder extending inward toward the port axis. The first annular shoulder is located along the port axis between the port threads and the tops of two flat, fitting walls. The two fitting walls are inclined relative to each other so that the tops of the fitting walls located closer to the port are spaced farther apart than the bottoms of the fitting walls so as to form a wedge-shaped recess extending into the fitting that opens onto the port. The longitudinal axis and flow passage pass through each of the fitting walls and the wedge-shaped recess.

The plug assembly used with this fitting includes a plug, a retaining ring and an extractor plate. The plug has a top end encircled by a circular top flange that extends away from the port axis and is configured to fit inside the port and optionally contact the first annular shoulder on the fitting during use. The plug has first and second opposing plug faces inclined relative to each other and are spaced further apart near the circular top flange and closer together at a distal end to form a wedge-shaped plug configured to fit into the wedge-shaped recess of the fitting in a sealing manner to block flow through the fitting during use. The plug advantageously has a plug fluid passage that in turn has a first end opening onto an exterior of the plug and a second end opening onto one of the plug faces. The plug fluid passage is in fluid communication with a valve to selectively block flow through the plug fluid passage.

The retaining ring has an inner and outer periphery. The outer periphery has external threads configured to threadingly engage the port threads on the fitting during use. The retaining ring has a plurality of wrenching surfaces. The inner periphery defines a retaining ring opening that allows exterior access to the plug fluid passage.

The extractor plate has a connecting portion extending toward and contacting and fastened to the plug through the retaining ring opening so the plug and extractor plate move together along and rotate together about the port axis. An outer periphery of the extractor plate extends radially over the inner periphery of the retaining ring to capture the retaining ring between the extractor plate and the plug. The central protrusion has a length along the port axis that forms a gap along the port axis between the retaining ring the extractor plate sufficient to allow rotation about the port axis of the retaining ring relative to the plug.

In further variations on the above combination of plug, extractor plate and retaining ring, the port threads comprise internal threads facing the port axis, and the retaining ring threads comprise external threads. One or more of the plug, retaining ring and extractor plate may be made of plastic. Advantageously, a plurality of threaded fasteners fasten the extractor plate to the plug. Further, the plug fluid passage may include a tube extending through the retaining ring opening and extractor plate, with the tube having an exterior end and an opposing end opening internally to the plug, and with the valve on an externally accessible end of the tube. The valve advantageously includes a rotating valve that is manually operated to selectively block or allow flow through the plug fluid passage. Advantageously, the plug fluid passage includes an opening on the side of the fitting undergoing pressure testing.

In still further variations, the connecting portion of the extractor plate comprises an annular flange that fits inside and passes through the retaining ring opening. The outer periphery of the extractor plate advantageously comprises circular flange extending radially outward from the port axis a distance beyond the retaining ring opening but not extending radially outward far enough to prevent a further plurality of the wrenching surfaces from being used to engage a tool to unscrew the retaining ring. The wrenching surfaces may include a plurality of recesses that extend along the port axis and have a closed bottom, sidewalls and an open top facing away from the plug. The plurality of recesses advantageously extend around a circumference of the retaining ring between the outer periphery and the circular retaining ring opening.

There is also provided a pressure testing assembly for pipelines that includes a fitting, a plug, a retaining ring, and an extractor plate. The fitting has walls defining a flow path extending along a longitudinal axis through the fitting. The fitting has opposing ends configured to connect to pipes to form the pipeline. The fitting includes a port defining a circular opening centered along a port axis that is perpendicular to the longitudinal axis and located on one side of the fitting. The circular opening of the port has port threads encircling the port and port axis. The fitting has walls defining at least a portion of a fitting recess around the flow path and opening onto the port. The fitting recess is defined in part by two flat fitting walls facing each other and inclined so a top of each fitting wall located toward the port is further apart than a bottom of each fitting wall located further from the port. The flow path extends through each fitting wall.

The plug is configured to fit through the port along the port axis and into the recess and to form a fluid tight seal with at least one wall of the recess to block the flow path between the fitting walls. The plug has a plug fluid passage with one end in fluid communication with the flow path through the fitting. The plug fluid passage has a distal end that is accessible externally to the fitting.

The extractor plate is fastened to a top of the plug and is located within a predetermined maximum distance of the top of the test device measured along the port axis. The extractor plate has a center opening through which the distal end of the plug flow path passes.

The retaining ring encircles the port axis and has a center opening and retaining ring threads configured to engage the port threads so rotation of the retaining ring moves the retaining ring along the port axis. The retaining ring is located within the predetermined maximum distance between the extractor plate and the plug. The extractor plate extends over the center opening of the retaining ring so the retaining ring is restrained by the extractor plate from moving along the port axis past the retaining ring. The retaining ring has a center opening smaller than a top of the plug so the retaining ring is restrained by the plug from moving along the port axis past the top of the plug. The retaining ring also has a thickness along the port axis that is smaller than the predetermined maximum distance so the retaining ring can rotate relative to the plug and extractor plate.

The above described parts are such that the retaining ring presses the plug into the fitting recess to block fluid flow between the fitting walls when the retaining ring threads engage the port threads and the retaining ring is rotated in a first direction. When the retaining ring is rotated in a second, opposing direction the retaining ring engages the extractor ring to move the extractor ring and the plug along the port axis out of sealing engagement with the fitting recess.

In further variations of the above assembly, at least one of the plug faces also includes a ring seal encircling the flow passage and sealing against the fitting wall adjacent the ring seal during use. Also, the distal end of the plug fluid passage includes a manually actuated valve to selectively allow the flow of fluid through the plug. Advantageously, the port threads may be internal threads and thus the retaining ring threads are external threads.

There is also included a pressure testing assembly for pipelines that includes a fitting, a plug, an extractor plate connected to the plug and a retaining ring axially captivated between the plug and the retaining ring. This assembly may include a fitting having walls defining a flow path extending along a longitudinal axis through the fitting. The fitting has opposing ends configured to connect to pipes to form the pipeline. The fitting also has a port defining a circular opening centered along a port axis that is perpendicular to the longitudinal axis and located on one side of the fitting. The circular opening of the port has port threads encircling the port and port axis. The fitting has walls defining at least a portion of a fitting recess around the flow path and opening onto the port. The recess is also defined in part by two flat fitting walls facing each other and inclined so a top of each fitting wall located toward the port is further apart than a bottom of each fitting wall located further from the port. The flow path extends through each fitting wall.

The plug of this assembly is configured to fit through the port along the port axis and into the recess and to form a fluid tight seal with at least one wall of the recess to block the flow path between the fitting walls. The plug has a plug fluid passage with one end in fluid communication with the flow path through the fitting. The plug flow path has a distal end that is accessible externally to the fitting.

The extractor plate of this assembly is fastened to a top of the plug and located within a predetermined maximum distance of the top of the test device measured along the port axis. The extractor plate has a center opening through which the distal end of the plug flow path passes.

The retaining ring of this assembly encircles the port axis and has a center opening and retaining ring threads configured to engage the port threads so rotation of the retaining ring moves the retaining ring along the port axis. The retaining ring is located within the predetermined maximum distance between the extractor plate and the plug. The extractor plate extends over the center opening of the retaining ring so the retaining ring is restrained from moving along the port axis past the retaining ring. The retaining ring has a center opening smaller than a top of the plug so the retaining ring is restrained by the plug from moving along the port axis past the top of the plug. The retaining ring has a thickness along the port axis that is smaller than the predetermined maximum distance so the retaining ring can rotate relative to the plug and extractor plate.

The above described parts of this assembly cooperate so that the retaining ring presses the plug into the fitting recess to block fluid flow between the fitting walls when the retaining ring threads engage the port threads and the retaining ring is rotated in a first direction. When the retaining ring is rotated in a second, opposing direction the retaining ring engages the extractor ring to move the extractor ring and the plug along the port axis out of sealing engagement with the fitting recess.

In further variations of this latest assembly, at least one of the plug faces may further include a ring seal encircling the flow passage and sealing against the fitting wall adjacent the ring seal during use. The distal end of the plug fluid passage includes a manually actuated valve to selectively allow the flow of fluid through the plug. Advantageously, the port threads are internal threads and the retaining ring threads are external threads.

There is also provided a pressure testing assembly for a pipeline having a fitting. The assembly includes plug with a connecting and a retaining ring captured between the plug and the retaining plate. The fitting has a flow path extending along a longitudinal axis of the fitting and having two inclined fitting walls through which the flow path passes. The inclined fitting walls form a wedge-shaped recess opening to a circular port extending along a port axis orthogonal to the longitudinal axis. The port has port threads encircling the port.

The plug of this assembly includes a wedge-shaped plug configured to fit into the wedge-shaped recess and seal the flow path between the fitting walls during use, the plug having a circular top.

The retaining ring has an inner periphery forming a center opening that is smaller than the plug's circular top. The retaining ring has an outer periphery with retaining ring threads configured to engage the port threads so rotation of the retaining ring in a first direction moves the retaining ring along the port axis toward the longitudinal axis and rotation of the retaining ring in an opposing second direction moves the retaining ring along the port axis away from the longitudinal axis.

The extractor plate is fastened to the plug through a center protrusion that extends through the center opening of the retaining ring so the retaining ring is between the extractor plate and the plug. The extractor plate is located at a predetermined maximum distance from the plug along the longitudinal axis. The extractor plate has an outer periphery that is larger than the center opening of the retaining ring to limit motion of the retaining ring along the port axis between the plug and the extractor plate. The extractor plate and plug are not fastened to the retaining ring so the retaining ring can rotate relative to the plug and extractor plate.

The parts of this assembly cooperate so that rotation of the retaining ring in a first direction when the retaining ring threads engage the port threads will engage the circular ring on the plug and push the plug into the fitting while rotation of the retaining ring in the opposite direction will cause the retaining ring to push the extractor plate and the plug that is fastened to the extractor plate, out of the fitting.

In further variations of this assembly, the retaining ring has a first position contacting the plug and has a second position contacting the extractor plate with the extractor plate at its maximum predetermined distance. The maximum predetermined distance allows the retaining ring to move along the port axis a distance of 0.001 to 0.5 inches between the first and second positions. The plug may also have a plug fluid passage with a first end located to be in fluid communication with the fluid passage of the fitting during use and with a second end located external to the plug. A portion of the plug fluid passage extends through the center opening of the retaining ring and through an opening in the extractor plate. The assembly may also include wrenching surfaces around the outer periphery of the retaining ring. The wrenching surfaces are not covered by the extractor plate and thus are accessible to engaging portions of manual wrenching tools.

There is also provided a method of making a wedge-shaped plug assembly used to block a fluid flow path through a fitting, with the assembly including the plug as well as an extractor plate connected to the plug and capturing a retaining ring between the plug and extractor plate. The fitting has a threaded circular port aligned with a wedge shaped recess formed in part by two opposing and inclined fitting walls through which the fluid flow path extends, the wedge-shaped plug having two opposing and inclined faces that each align with a different one of the respective fitting walls to block fluid flow through the fitting when the plug is inserted through the circular port along a port axis and into the wedge-shaped recess.

The method includes the step of placing a retaining ring on a circular top of the plug. The retaining ring has an outer peripheral edge with external threads configured to engage the threaded circular port during use. The retaining ring also has a plurality of wrenching surfaces and a retaining ring opening at its center to form a retaining ring.

The method also includes the step of fastening an extractor plate to the top of the plug through the retaining ring opening so the plug and extractor plate are fastened a predetermined maximum distance apart along the port axis and move together along the port axis as a single unit. The maximum predetermined distance allows placing an outer flange of the extractor plate that overlaps a portion of an inner periphery of the retaining ring a distance G above a top surface of overlapped portion of the inner periphery of the retaining ring. The distance G is measured along the port axis and is sufficient to avoid clamping between the extractor plate and retaining ring and to allow the retaining ring to rotate about the port axis relative to the plug.

In further variations of this method, the distance G is between 0.001 and 0.4 inches. Further, the fastening step may include a central protrusion on the extractor plate which central protrusion encircles the port axis and extends to the plug and is fastened to the plug. The central protrusion may have a length along the port axis that is greater than the distance along the port between the circular top of the plug and the top surface of the overlapped portion of the retaining ring by the distance G. In this method, the wrenching surfaces may comprise a plurality of recesses extending along the port axis and having a closed bottom and sides with an open top facing away from the plug. The fastening step may include a plurality of threaded fasteners extending parallel to the port axis and fastening the extractor plate and the plug together.

There is also provided a method for pressure testing a pipeline having a fitting, using a plug with an extractor plate and a retaining ring between the plug and extractor plate. The fitting has a longitudinal fitting axis and a flow passage through the fitting along that longitudinal axis. The fitting also has a circular port centered on a port axis that is orthogonal to and intersecting the longitudinal axis. The port has internal port threads encircling and facing the port axis with a first annular shoulder extending inward toward the port axis. The first annular shoulder is located along the port axis between the port threads and the tops of two flat, fitting walls that are inclined relative to each other to form a wedge-shaped recess between the fitting walls with the fitting walls that are closer to the port being spaced farther apart than the fitting walls further from the port as measure along the port axis. The longitudinal axis and flow passage pass through each of the fitting walls and the wedge-shaped recess. The wedge-shaped recess may extend into side-walls of the fitting to encircle the flow passage.

The method includes the step of inserting a wedge-shaped plug through the port along the port axis and into the wedge shaped recess. The plug has a circular top flange extending away from the port axis and configured to fit inside the port and to contact the first annular shoulder on the fitting to limit insertion of the plug into the fitting. The plug has two opposing and inclined faces that each align with a different one of the fitting walls.

The method includes threadingly engaging external threads on a retaining ring with the internal threads on the port, with the retaining ring being captivated along the port axis between the plug and an outer periphery of an extraction plate that encircles the port axis and is fastened to the plug so the retaining ring rotates about the port axis and relative to the plug and the extraction plate.

The method includes rotating the retaining ring in a first, tightening direction relative to the plug so the retaining ring pushes the plug along the port axis and into the fixture recess until the plug seals against the fixture recess and blocks fluid flow through the fitting. The fitting walls cooperate with the plug faces to restrain rotation of the plug about the port axis as the retaining ring is rotated in the first direction.

The method also includes pressure testing the pipeline located on one side of the plug and then releasing the testing pressure.

The method includes rotating the retaining ring in a second, loosening direction about the port axis and relative to the plug until the retaining ring contacts the extraction plate and then continuing to rotate the retaining ring in the second direction to move the extraction plate and the plug that is fastened to the extraction plate, along the port axis in a direction away from the fitting recess.

Further variations of the above method may include the step of disengaging the retaining ring from the port and removing the retaining ring, plug and extractor plate as a single unit. The further variations may also include the step of manually grasping at least one of the plug and retaining ring and removing the plug from the fitting. Advantageously, at least one of the rotating steps includes the further steps of engaging portions of a manual tool with engaging surfaces on opposing sides of the retaining ring and moving a handle of the tool partially around the port axis to rotate the retaining ring. Additionally, or alternatively, at least one of the rotating steps may include the further step of manually grasping the retaining ring and rotating the retaining ring by hand.

In further variations of this method, the plug may include a plug fluid passage having an interior end in fluid communication with the plug face of the pipeline undergoing pressure testing, and the fluid passage may have a distal end passing through an opening in the extraction plate and located exterior of the fitting. The distal end is configured to connect to one of a gas source or a water source to pressurize the fitting and a portion of the pipeline for pressure testing. The plug fluid passage may be in fluid communication with a valve having a closed and open position. The pressure testing step may occur with the valve in the closed position and the step of releasing the pressure may occur with the valve in the open position.

BRIEF DESCRIPTION OF THE DRAWINGS

These and other advantages and features of the invention will be better appreciated in view of the following drawings and descriptions in which like numbers refer to like parts throughout, and in which.

DETAILED DESCRIPTION

Figure 1:
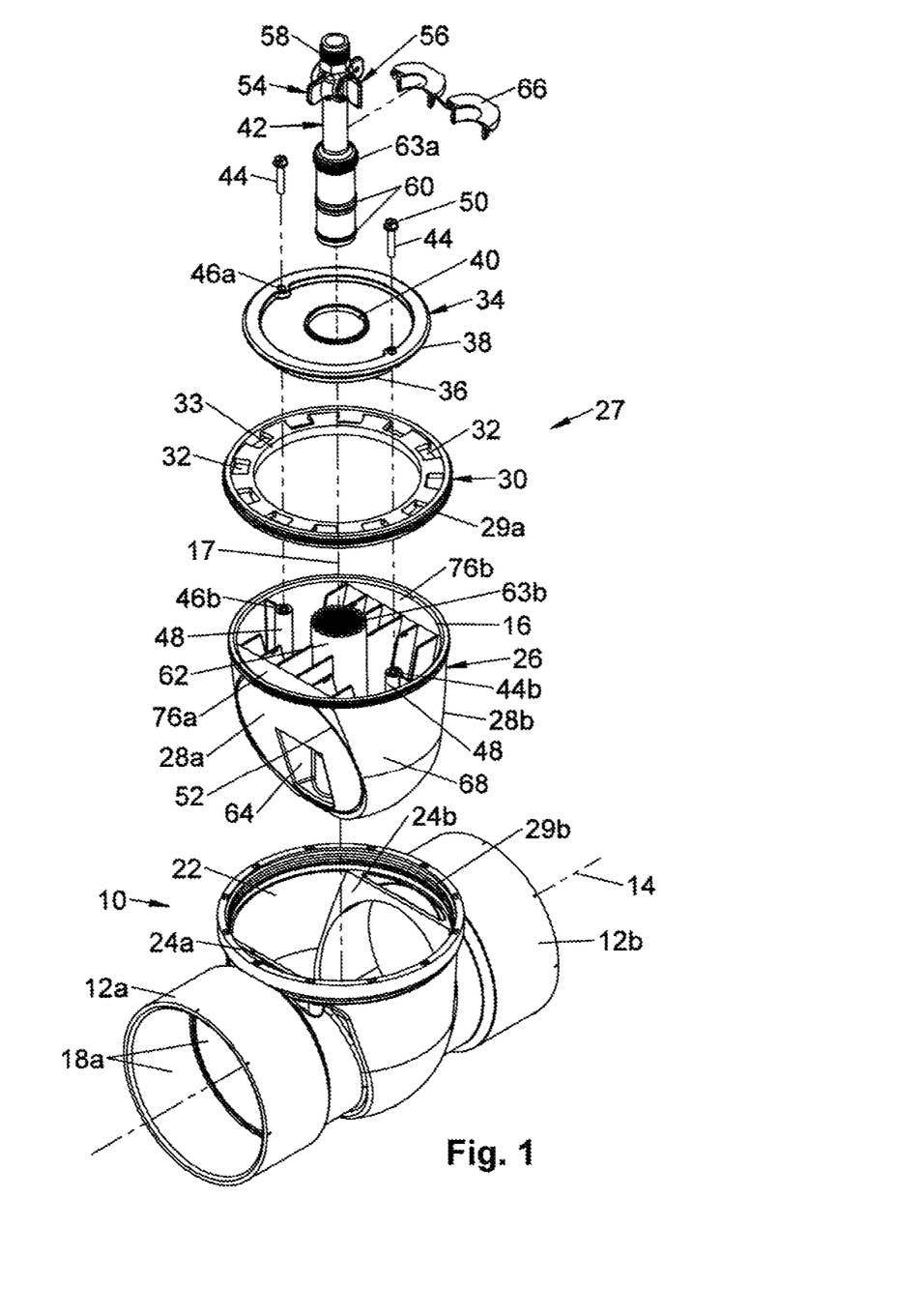
FIG. 1 is an exploded perspective view of a valve and fitting assembly.
Figure 3:
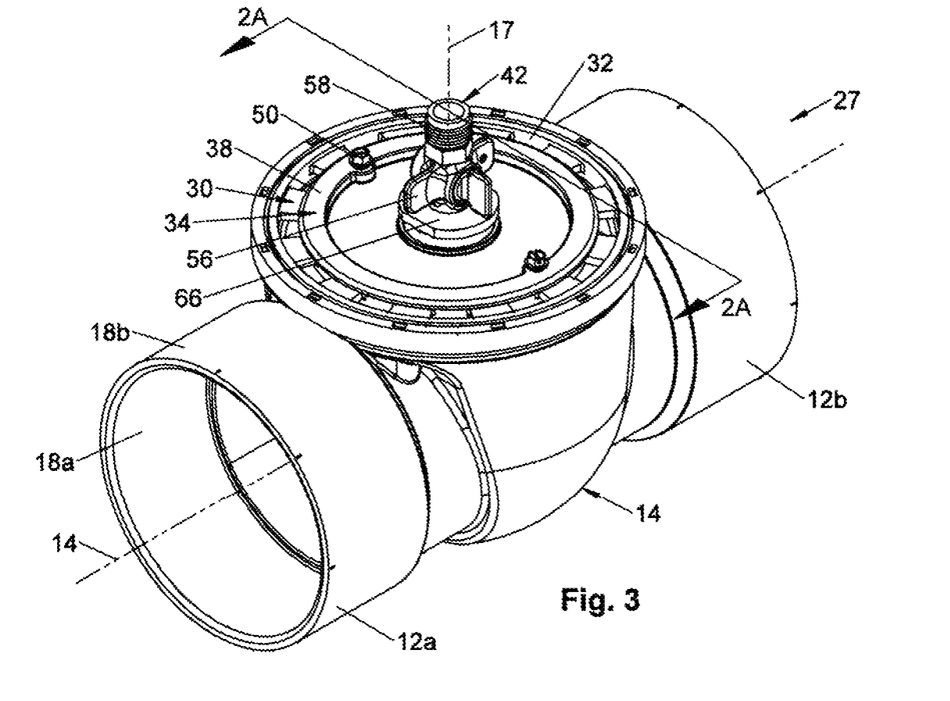
FIG. 3 is a valve and fitting assembly showing the parts of FIG. 1 in an assembled configuration.

As used herein, the relative directions top and bottom are with respect to the fitting as shown in FIGS. 1 and 3 where the flow channel and longitudinal axis are horizontal and the port is centered on a vertical axis. The orientation may change in actual use as the parts may be in different orientations. The relative directions inner and outer are with respect to the longitudinal axis of the fitting which is shown as horizontal in FIG. 1, or the port axis, which is shown as vertical in FIG. 1. As used herein, distances measured along a specified axis include distances measured along axes that are parallel to the specified axes.

Referring to FIGS. 1-4, a plumbing fitting 10 has at least one end, and preferably two opposing ends 12a, 12b, adapted to connect to an end of a pipe line or other conduit for pressure testing the line. Typically, the ends of the pipe line are male ends inserted into the enlarged, female ends of the fitting as shown in FIGS. 1A and 1B, although the fitting could abut the end(s) of the pipeline with flexible tubular seals clamped over abutting ends of the fitting TO and pipeline 11 with hose clamps as is known in the art, or the fitting could have male ends configured to extend into and mate with female ends of the pipeline, or combinations of the above.

The fitting 10 has a longitudinal fitting axis 14 along which fluid flows during use. The fitting has as circular opening or port 16 on one side of the fitting and into which pressure testing apparatus is inserted. The port 16 may be on the top side as show in FIG. 1, bottom side, left or right sides, or at any inclination around the periphery of the fitting. The fitting has interior walls 18 and exterior walls 20. A fitting recess 22 is formed in or by the interior walls 18, with the recess having opposing, inclined fitting walls 24a, 24b that are separated and form a wedge-shaped recess, preferably a U shaped or V-shaped recess (viewed from the side) that is wider at the top at port 16 and narrower at the bottom opposite the port 16, although the opposing walls at the bottom of the recess are spaced apart. The fluid flow path passes along axis 14 through an opening in these fitting walls 24a, 24b and through the wedge-shaped recess formed by the fitting walls.

The interior fitting walls 18 define a cylindrical flow path along longitudinal fitting axis 14 through at least a portion of the fitting. The port 16 is externally accessible and preferably located at the top of the fitting. The port 16 forms a circular opening centered around a longitudinal port axis 17 of the port 16. The port axis 17 extends toward and preferably intersects the longitudinal fitting axis 14. The port axis 17 is typically perpendicular to the longitudinal fitting axis 14. The circular opening of the port 16 advantageously extends along port axis 17 for only a short distance and stops at the location of the outer or exterior tubular walls 18. The circular opening in the port 16 is preferably larger than is the diameter of the fluid passageway formed by interior walls 18, which advantageously is the same as the inner diameter of the pipeline. The port 16 advantageously has a first annular shoulder 25 (FIG. 2B) extending inward toward axis 18. The annular shoulder 25 is shown as a continuous shoulder but could be intermittent.

A fitting assembly 27 is provided that includes the fitting 14 with inclined fitting walls 24a, 24b, and as described later and shown in FIG. 1, include a wedge-shaped testing device such as wedge-shaped plug 26, retaining ring 30 and extractor plate 34 as described later. A test device such as test plug 26 is removably inserted into the port 16 of the fitting 10 and has oppositely inclined plug faces 28a, 28b on opposing sides of the plug. The fitting 14 has a recess 22 opening to the port and encircling the fluid flow path which passes through oppositely inclined fitting walls 24a, 24b. The recess 22 in the fitting is described in more detail later but it is basically a wedge-shaped recess configured to receive a plug that is wedge shaped to block flow through the fitting 14 for pressure testing. The plug faces 28a, 28b seal against fitting walls 24a, 24b, respectively, to provide a fluid tight seal in the fitting 10 to allow pressure testing of the drain system upstream of the test device 26. The test plug 26 is held in position by a retaining mechanism.

A threaded retaining ring 30, such as a spanner ring, is used in the illustrated embodiments and is configured to be engaged by a spanner wrench and manually rotated with or without air of a manual tool. The retaining ring 30 has retaining ring threads 29a mating with corresponding port threads 29b on the port 16. The threads 29b advantageously extend along port axis 17 from the first shoulder 25 to the top of the opening forming the port 16. Preferably the retaining ring 30 has external retaining ring threads 29a on a radially outward facing side that mate with internal port threads 29b inside port 16 so the retaining ring 30 is inside the port. Buttress threads, Acme threads or other high strength threads are preferred for threads 29. Advantageously the outer periphery of retaining ring 30 is configured for engagement by a wrench and that outer periphery may be located inside or outside of the port 16. While the port threads 29b are shown as internal threads on the inside of the port, they could be external threads on the outside of the port and engage internal threads on a skirt depending from an outer portion of the retaining ring 30.

Figure 2A:
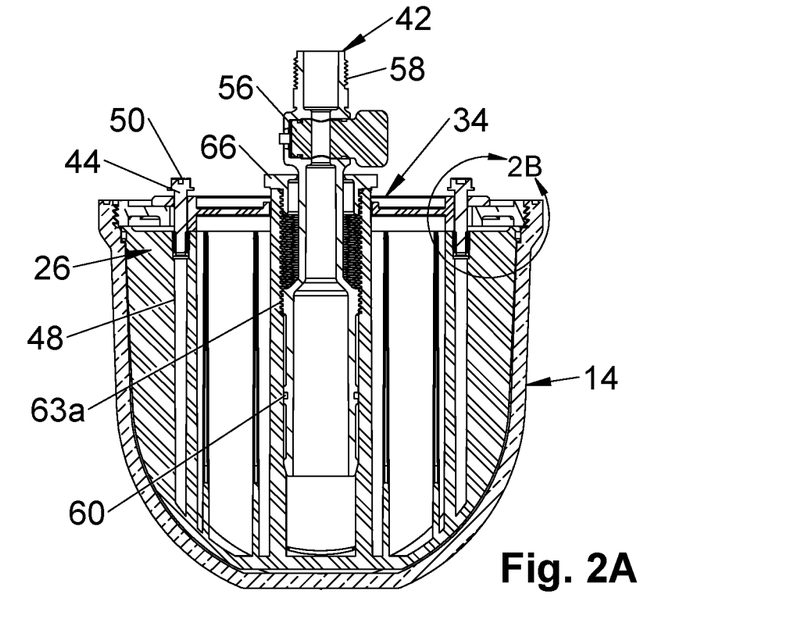
FIG. 2A is a cross-sectional view of a valve and fitting assembly taken along section 2A-2A of FIG. 3, with a head of a threaded fastener located above an extractor plate.
Figure 2B:
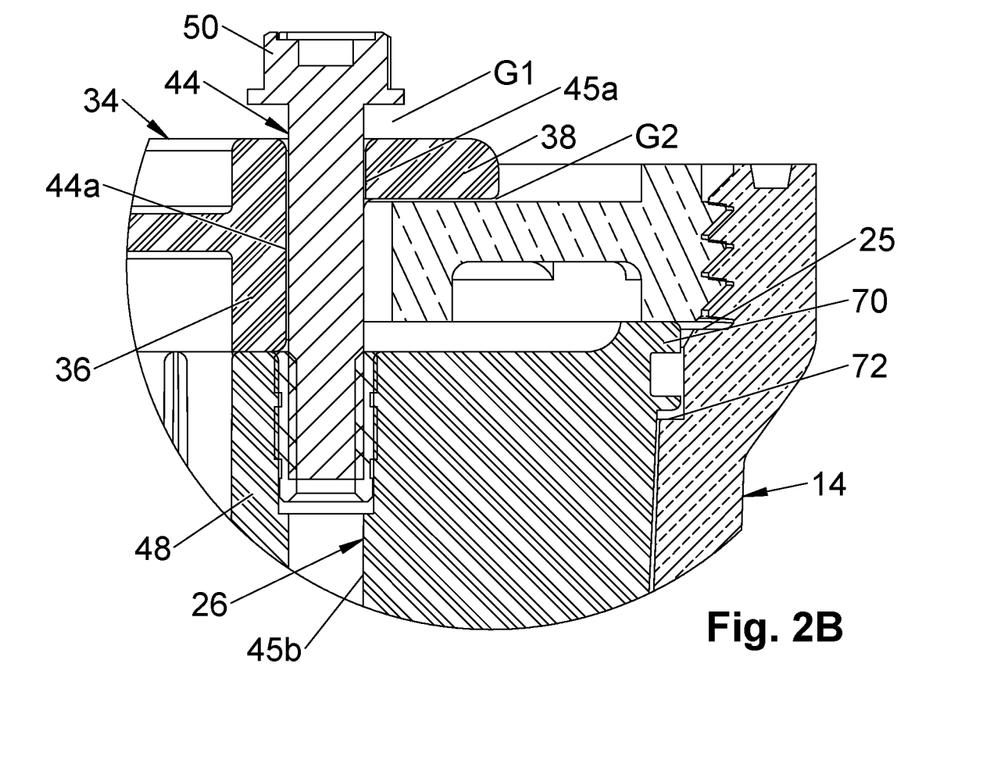
FIG. 2B is an enlarged cross-sectional view taken from section 2B-2B of FIG. 2A.

Advantageously, the retaining ring 30 has an axial thickness parallel to port axis 17 which is preferably about the same as the axial distance from the first shoulder 25 to the top of port 16 so the bottom of the retaining ring 30 is very close to first shoulder 25, but preferably not contacting first shoulder 25 when the top of the ring is flush with the top of the port 16 as seen in FIG. 2B. The first should 25 may limit axial position of retaining ring 30 along axis 17. The retaining ring 30 thus preferably fits within the port 16.

Adjacent to and extending around the outer periphery of retaining ring 30 are a plurality of wrenching surfaces 32 shown as generally rectangular recesses extending along port axis 16 and having a closed bottom and sidewalls, with the sidewalls including radially extending sidewalls. Recesses are around the periphery of the retaining ring 30 and may curved sides on the radially inner and outer sides of the recesses, with the opposing sidewalls extending along radii passing through the port axis 17. The wrenching surfaces 32 are configured to engage channel locks, spanner wrenches or other wrenching tools having projections located to engage recesses 32 or the walls defining those recesses—on opposing sides of the retaining ring 30. The wrenching tool has a handle to provide a lever effect to increase the torque manually applied to the wrenching surfaces of the retaining ring 30 by the operator or user. Other configurations of wrenching surfaces 32 and mechanisms could be used, including spokes, cogs, slots, pins, et. cet. to aid in gripping and turning the retaining ring 30 with hand tools. Other rotating mechanisms could be used other than a threaded ring, such as a bayonet lock or other rotational locks. The retaining ring 30 thus preferably has an annular shape with threads 29b on an outward facing peripheral edge of the retaining ring, and a central ring opening 33 in the middle of the retaining ring with wrenching surfaces 32 in the top, axial facing surface of the retaining ring.

Figure 4A:
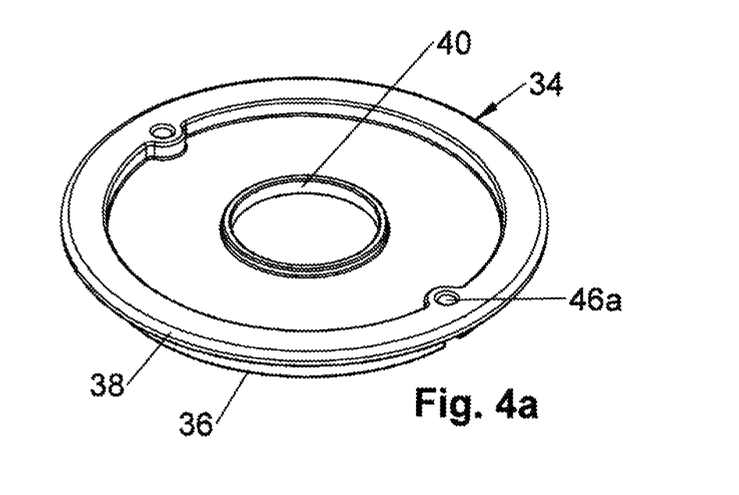
FIG. 4A is a top perspective view of the extractor plate of FIG. 1.
Figure 4B:
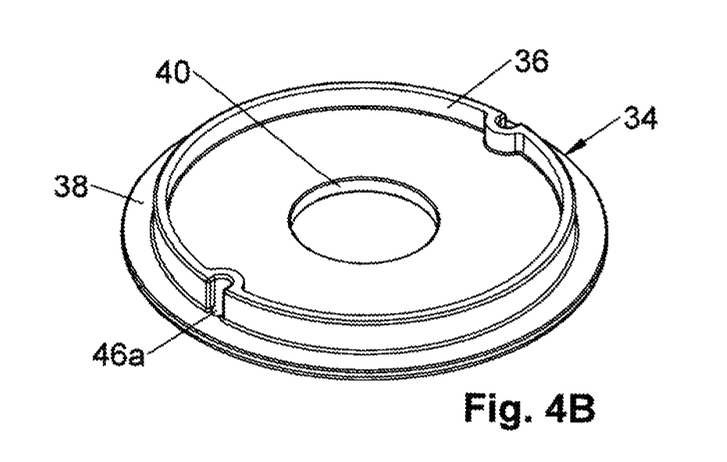
FIG. 4B is a bottom perspective view of the extractor plate of FIG. 4A

An extractor plate 34 is fastened to the retaining ring 30 and to the plug 26. The extractor plate 34 is shown as a circular plate parallel to the retaining ring and configured to extend radially outward beyond the inner periphery of the retaining ring 30 and thus extends over center ring opening 33. The radial overlap of the extractor plate 34 and the retaining ring 30 allow the extractor plate to restrain movement of the retaining ring along the port axis 17 as the retaining ring rotates relative to the plug and extractor plate. Advantageously, the extractor plate 34 has a radially outward extending flange 38 that overlaps (extends radially beyond) the inner periphery of the retaining ring 30 formed by the center ring opening 33. The extractor plate preferably has a depending center boss or center flange 38 that fits inside and extends through the center ring opening 33 of the retaining ring 30. The center protrusion or flange 38 has an axial length sufficient so the center boss 38 contacts and optionally fastens to the plug 26. An annular center flange 38 is shown (FIGS. 4A-4B) forming a short, cylindrical tube. The extractor plate 34 is preferably annular and has central hole 40 preferably formed by the tubular center flange 38.

A tube 42 preferably extends through the hole 40 and may extend exteriorly of the plug assembly to allow a user to place the plug 26 in fluid communication with a drain or water source outside the tube 42.

A plurality of threaded fasteners 44 fasten the extractor plate 34 to the plug 26 but not to the retaining ring 30 so the retaining ring can rotate about axis 17 relative to the plug 26 and extractor plate 34. Advantageously, from two to 5 fasteners 44 are used. The fasteners 44 are advantageously located to pass through aligned holes 46a in the extractor plate 34 and holes 46b in the plug 26. The holes 46b in the plug preferably are formed in stiffeners 48 in the plug 26 so the threaded fasteners can engage the sides of the holes 44b and stiffeners 48 to provide a sturdy and secure connection with the plug that will not break or allow the fasteners to pull out of the plug during use. The plugs 26 are typically injection molded of suitable plastic and the stiffeners 48 may take the form of cylindrical bosses molded along a stiffener of the plug, with the cylindrical boss each having a tubular end sized to allow the threads on fastener 44 threadingly engage the hole in the tubular end. The fasteners 44 are located inward of the inner periphery of the retaining ring 30 so the fasteners do not impede rotation of the retaining ring about axis 17. Thus, the fasteners 44 and holes 46 are inward of the center ring opening 33.

As best seen in FIGS. 2A and 2B, the retaining ring 30 is captured along axis 17, between the bottom of extractor plate flange 38 and the top of plug 26. There is a small axial space or axial gap G2 between the bottom of the extractor plate flange 38 and the top of the retaining ring 36 with a head 50 of each threaded fastener 44 holding the extractor plate tightly against the plug by pressing center protrusion or flange 50 against the plug 26 as in FIGS. 5A and 5B, or allowing an additional gap G1 as in FIGS. 2A and 2B, as discussed later. The length of the protrusion or flange 50 along port axis 17, relative to the axial length of the top surface of the retaining ring which would be contacted by the extractor plate flange 38, sets the gap G2. A gap G2 between about 0.001 to 0.01 inches is believed suitable. As long as there is a large enough gap to allow free relative rotation of the retaining ring relative to the connected plug 26 and extractor plate 36 under manual force and without the aid of tools, the smallness of the gap G2 is not believed critical. The gap G2 should not be larger than the axial travel of the threaded engagement of threads 29a, 29b on the retaining ring 30 and port 16, because then the retaining ring would be removed before providing any axial removal force to the extractor plate and plug 26.

By making the axial length of the center boss 36 large enough, the flange 38 on the extractor plate does not clamp the retaining ring 30 against the plug and instead there is a gap between those parts that allows the retaining ring 30 to rotate relative to the connected plug and extractor plate—but still connects the extractor plate 34 to the plug 16 so those parts move together axially along port axis 17 and so those parts rotate (or don't rotate) together about axis 17. The result is that when the wedge-shaped plug 26 is inserted into the wedge-shaped recess 22 between the fitting walls 24a, 24b, the plug is prevented from rotating about port axis 17 while the retaining ring 30 can rotate, with the small axial gap G2 between the extractor plate flange 38 and retaining ring allowing the retaining ring to rotate and screw into and unscrew out of the port 16.

During installation, the bottom of the retaining ring 30 pushes against the top circular flange 70 on the plug 26 to push the plug into the fitting—as the retaining ring 30 is rotated and threads 29a and 29b on the retaining ring and port 16 engage. The mating threads 29a, 29b on the retaining ring and port provide a mechanical advantage to force the wedge-shaped plug into the wedge-shaped recess between the fitting walls 24a, 24b to form a fluid tight seal. The retaining ring remains holding the plug 26 in position during testing and until it is unscrewed. During removal, the retaining ring 30 is unscrewed and when the top of the retaining ring moves axially along port axis 16 across the gap G2 then further axial motion of the retaining ring also moves the extractor plate flange 38 and extractor plate 34 and connected plug 16 along port axis 17. The rotation of the retaining ring 30 using mating threads 29a, 29b thus moves the plug 26 along port axis 17 to extract the plug from frictional engagement with the fitting. The threads 29a, 29b provide a mechanical advantage that by itself may be sufficient to remove the plug 26 from the frictional engagement with the fitting walls 24a, 24b. The use of high strength buttress threads and ACME threads further provides a larger mechanical advantage with higher frictional resistance to back-driving than normal threads of larger or even similar lead.

In use, the fitting 10 is connected to a pipeline, typically with port 16 vertically upward—but the orientation can vary. The plug 26 may be fastened to the extractor plate to confine the retaining ring connection between the plug and extraction plate either after the plug is inserted into the fitting recess 22, or before. Advantageously the plug 26, extractor plate 38 and retaining ring are assembled as a unit to ensure the ring can rotate relative to the plug and extractor plate. In that preassembled configuration, the plug 26 is inserted into the port 16 and, as the plug faces 28 engage the fitting walls 24 to prevent the plug from rotating, the retaining ring is rotated in a first, tightening direction to form a fluid tight seal between the plug faces 28a, 28b and the fitting walls 24a, 24b, respectively. A circular sealing ring 52 is preferably located in a groove in each plug face 28a, 28b (or in the fitting walls 24a, 24b) so a sealing ring is interposed between each set of respective faces 28 and walls 24 to further assist in sealing. Each sealing ring 52 encircles the flow passage through the fitting 10.

If the preassembled plug, extractor plate and retaining ring are not used, then plug 26 is inserted along port axis 17 into the port 16 and orientated so that plug faces 28a, 28b contact and seal against fitting walls 24a, 24b, respectively to at least partially block flow through the fitting. The engagement of the plug faces 28a, 28b with the respective fitting walls 24a, 24b prevent the plug from rotating about port axis 17 relative to the fitting 10. The retaining ring 30 is then screwed into the port 16 and pushes the wedge-shaped plug 26 into the wedge-shaped fitting recess until the plug seals against one or both of the fitting walls 24a, 24b to block flow between the fitting walls and through the fitting. The retaining ring pushes against the plug and the back-driving friction force of the mating threads 29a, 29b prevents the retaining ring from unscrewing so the retaining ring prevents the plug from moving along port axis 17 out of the port 16 and fitting during testing. Wrenching surfaces 32 on opposing sides of the retaining ring may be optionally engaged by a manual tool such as channel locks or a spanner wrench to obtain leverage to tighten the retaining ring 30 and move the plug 26 further into the fitting TO until a fluid tight seal is obtained between the wedge-shaped plug 26 and the wedge-shaped recess between the fitting walls 24a, 24b (and the ring seals 52 on the plug that encircle the flow passage through the fitting and seal against the fitting walls 24a, 24b).

Before or after the retaining ring 30 is tightened to seal the plug faces 28 against the fitting walls 24, the extractor plate 34 is placed so its center boss 36 fits into the center ring opening 33 of the retaining ring, with the extractor plate flange 38 overlapping the inner periphery of the retaining ring in the radial direction relative to the port axis 17. The extract plate flange 38 does not block the wrenching surfaces 32, or at least does not block them enough to prevent their use to engage a wrench and rotate the retaining ring 30. The holes 46a, 46b are aligned and the threaded fasteners 44 are inserted and tightened to connect the extractor plate 34 to the plug 26, but leaving enough space that the extractor plate is not immovably clamped against the retaining ring 30 and instead allowing the extractor plate and retaining ring to rotate relative to each other. For pressure testing, the plug 26 is wedged between the fitting walls 24a, 24b and will not rotate about port axis 17. Rotation of the retaining ring 30 in a tightening direction will further drive the plug 26 into sealing engagement with the walls 24 of the fitting 10. Once the plug 26 is sealed into the fitting recess 22, the fitting and plug are ready for pressure testing and have essentially the same construction whether or not the plug, extractor plate and retaining ring were preassembled.

Once the wedge-shaped plug 26 has sealingly engaged inclined fitting walls 24a, 24b and sealing rings 52 and the retaining ring 30 pushes the plug into the wedge-shaped recess between the walls 24a, 24b to seal the flow passage through the fitting TO, then water or air fills one side of the fitting for pressure testing of the pipe line connected to the fitting. Water can be introduced through the tube 40 which is in fluid communication with the side opening 64 in the plug on the fluid side of the fitting that is being tested. After testing, the prior art released the testing pressure and at least some of the testing fluid and then removed the retaining ring 30 and manually pulled the plug 26 from the fitting along the port axis 17. But the wedging occurring during installation and sealing, and the testing pressure, force the plug faces 28 against at least one fitting wall 24 and force at least one of the sealing rings 52 into increased frictional engagement with the fitting walls 24, all of which make it difficult to remove the plug from the fitting after testing is completed. During pressure testing it is believed that the force needed to remove the plug 26 from the fitting increases, either because the plug is more tightly wedged into the fitting recess or because the sealing rings 52 deform and stick more tightly to the plug and fitting walls, or for some other reason.

But by using the extractor plate 34 and retaining ring 30 as described here, rotation of the retaining ring 30 in a removal, loosening direction will also sue the threads 29a, 29b to move the extractor plate 34 and the connected plug 26 along the port axis 17 in a direction out of the port 16 and away from the fitting 10 (once the slight gap G2 or G2+G1 between the heads 50 and extractor plate is taken up), as discussed in more detail later. Thus, the wrenching force exerted on wrenching surfaces 32 to loosen and remove the retaining ring 30 also provides a mechanical advantage to remove the plug 26, and the mechanical advantage provided by the mating threads 29a, 29b on the retaining ring and port, also provide a mechanical advantage to remove the plug 26. While the retaining ring 30 rotates about the port axis 17, the plug and preferably the extractor plate fastened thereto do not rotate. Instead, both the plug and extractor plate move along the port axis 17.

The length of threaded engagement of threads 29a, 29b is short, about 0.3 inches to 1 inch, and preferably about 0.4 inches. That provides only a short length of movement of the plug 26 along the port axis 26 with the assistance of the mechanical advantage provided by the wrench, wrenching surfaces 32, and threads 29a, 29b. But it is believed that the short length of threaded engagement and short length of axial travel is sufficient to allow manual removal of the plug 26 after the retaining ring 30 is disengaged from the port. It is believed that an axial movement along port axis 17 of about 0.02 to 0.05 inches is typically sufficient to remove a substantial majority of the frictional forces restraining removal of the plug 26 from the fitting walls 24a, 24b. That short travel length provides or allows a very compact removal mechanism.

When the retaining ring 30 is threadingly disengaged from the threads 29b on the port 16, the retaining ring and extractor plate remain fastened to the plug 26 by the threaded fasteners 44 (or other connections). It is believed that the short travel along port axis 16 is sufficient to remove any holding force the fitting and its inclined walls 24a, 24b exert on the plug 26, so that once the retaining ring is disengaged, a user need only exert sufficient force on the plug to move the weight of the plug and connected parts, including the retaining ring, extractor plate and any connections to the plug such as the tube 42 and any water inside the plug.

The mechanical advantage provided by the threads 29 and the wrenching tool, applied over a very short length of about 0.2 to 1 inches, are believed sufficient to remove the plugs 26. Among other things that increase the removal force, it is believed that the sealing rings 52 that are interposed between the fitting walls 24a, 24b and the respective faces of 28a, 28b of the plug 26, may deform and provide a significant force inhibiting removal of the plug 26 from the fitting recess 22. A sealing ring 52 is typically placed in a groove encircling the outer periphery of each face 28a, 28b of the plug 26. The sealing rings 52 and mating grooves in the plug faces 28 are typically circular, and the cross-section of the grooves are typically semi-circular. But the plug faces 28 and fitting walls 24 are inclined and the plug is wedged into position between the walls 24a, 24b, so the pressure on the sealing rings 52 is significant from being inserted into the fitting recess and the pressure testing increases the force needed to remove the plug from the fitting recess.

The extractor plate advantageously has a small thickness along port axis 17 and preferably fits within a recess in the axial thickness of the retaining ring 30 so as to allow a compact assembly of small axial thickness. As seen in FIGS. 2A and 2B, the retaining ring 30 has a circular recess facing away from the plug 26 and into which the extractor plate 34 fits so that a majority of the axial thickness of the extractor plate being contained in the recess of the retaining ring. This low height of the retaining ring and extractor plate measured along the port axis 17 allows a very compact closure for the port 16, while allowing the mating threads 29a, 29b to provide a mechanical advantage to retract the wedge-shaped plug 26 from the wedge-shaped recess 22 along the port axis 17.

The outer periphery of the retaining ring 30 is larger than the outer periphery of the circular flange 70 on the plug 26 so as to enable the retaining ring to engage the port 16 while pressing the plug into the port and while removing the plug from the port—depending on the direction of rotation. The center retaining ring opening 33 is advantageously a relatively large opening physically, preferably from 1-4 inches in diameter for a retaining ring diameter of 4 to 12 inches, so the diameter of the center opening 33 is about ¼ the diameter of the retaining ring outer diameter.

Any type of wedge-shaped plug 26 is believed suitable for use with the above described extractor plate 38 and retaining ring 30. But the above described extractor plate 38, plug 26 and retaining ring 30 are believed especially useful with the pipe test fittings described in U.S. Pat. No. 8,141,826, the complete contents of which is incorporated herein by reference. The depicted plug 26 has tube 42 comprising a tubular fill—drain cartridge 54 with a rotary valve assembly 56 to block and unblock flow through the tube. The exterior, distal end of the tube 42 has threads 58 suitable for connecting to a garden hose. The fill—drain cartridge 54 has sealing rings 60 encircling the tubular body of the cartridge 54 with the sealing rings 60 configured to seal against the inside of a central tube 62 on the plug 26. Threads 63a on an outer portion of the fill—drain cartridge 54 may engage mating threads 63b on the inside of the central tube 62 to position and hold the cartridge 54 in the central tube 62. The interior end of the fill-drain cartridge 54 is open and in fluid communication through the central tube 62 with a side opening in the fluid side of the plug 26. Water can flow into or out of side opening 64 and through the tube 42 and any garden hose connected to threads 58 to drain or pressurize the fitting and any pipeline on the side of the plug on which the side opening 64 is located. A lock nut 66 may encircle the fill-drain cartridge 54 at the top of the central tube 62 to further interconnect the cartridge to the central tube.

The tube 42 thus forms a plug fluid passage having a first end in fluid communication with the fluid passage along axis 14 through the fitting. The distal, **second end of the tube 42 is externally accessible, preferably having an air hose connection, a garden hose bib connection, or other fluid connection to pressurize the fitting and pipeline for pressure testing, and to release pressure after testing. The valve assembly 56 when closed, maintains the pressure in the fitting and pipeline and when closed allows the release of pressure in the fitting and pipeline.

The plug 26 has flat plug faces 28a, 28b inclined toward the bottom of the fitting and inclined toward the port axis 17. The plug 26 has curved sidewalls 68 (FIG. 1) joining the plug faces 28a, 28b. Advantageously, the top of plug 26 has a flange 70 (FIG. 2B) extending outward in a plane perpendicular to port axis 17, with a sealing ring in a radially outward facing edge of that flange 70 to seal against an inner surface of the port 16. The sealing ring could also be placed on the annular shoulder 25 instead of on the edge of flange 70, or in addition to a seal on the edge of the flange 70. As best seen in FIG. 2B, the flange 68 advantageously rests on a second shoulder 72 on the port 16, with the first shoulder 25 being between the second shoulder 72 and the open top of the port. The first shoulder 25 and second shoulder 72 face the same direction along port axis 17, with the first shoulder 25 being closer to the open end of the port than the second shoulder 72. In use, the port's second shoulder 72 can contact flange 70 on plug 26 to limit the distance the plug is inserted into the port and into the fitting. The first shoulder 25 can limit the distance along port axis 17 that the retaining ring 30 is screwed into the port and that also limits the distance the plug is inserted into the fitting.

As seen in FIG. 2B, each threaded fastener 44 has head 50 that preferably has a central recess for a shaped tool such as a screwdriver slot, an Allan wrench recess or a star drive recess, and advantageously also has an exterior wrenching surface. In FIG. 2B, the fastener head 50 is spaced above the top surface of the extractor plate 34 by a short distance G1, while in FIG. 5B the fastener head is screwed tight against the top of the extractor plate. In both FIGS. 2B and 5B there is a slight gap G2 between the bottom of the extractor plate flange 38 that overlaps the inner periphery of the ring 30 and that gap G2 is set by the axial length of the center protrusion or flange 36 relative to the axial thickness of the retaining ring 30 along the port axis 17.

The shaft of the threaded fastener 44 is threaded at its distal end to threadingly engage the boss or stiffener 48 on the plug, but the intervening length of the shaft may be cylindrical and without threads so the extractor plate 34 may move freely axially along port axis 17. The location of the fastener heads 50 set a maximum predetermined distance that the extractor plate 34 can move along axis 17 the fastener heads 50. The configuration of FIGS. 5A and 5B has the fastener heads 50 fastening the central protrusion or flange 36 against the plug 26 so the extractor plate is held tightly to the plug with the retaining ring 30 able to move along the port axis 26 a distance G2 between the retaining ring and extraction plate. When the retaining ring 30 is unscrewed after pressure testing, the retaining ring must move a distance of G2 along the port axis 70 before the top of the retaining ring hits the extractor plate 34 and begins to move both the extractor plate and plug 26 out of engagement with the fitting recess 22.

The configuration of FIGS. 2A and 2B allow the retaining ring to move a distance of G1+G2 because the extractor plate and retaining ring can both move along port axis 17. Depending on the orientation of port axis 17, gravity may urge the extractor plate 34 toward the plug in which event the bottom of the extractor plate is a distance G2 above the top of the retaining ring 40. In other orientations the extractor plate 34 may be separated by the distance of G1+G2 from the retaining ring, as for example, when the extractor plate is contacting the heads 50 of the fasteners 44. When the retaining ring 30 is unscrewed after pressure testing, the retaining ring must move a distance of G1+G2 along the port axis 70 before the top of the retaining ring forces the extractor plate 34 against the top of the screw heads 50 and begins to move both the extractor plate and plug 26 out of engagement with the fitting recess 22. The configuration of FIGS. 2A-2B thus allows movement of the retaining ring 30 along portion axis 17, without moving the plug 26 or extractor plate 34.

Figure 5A:
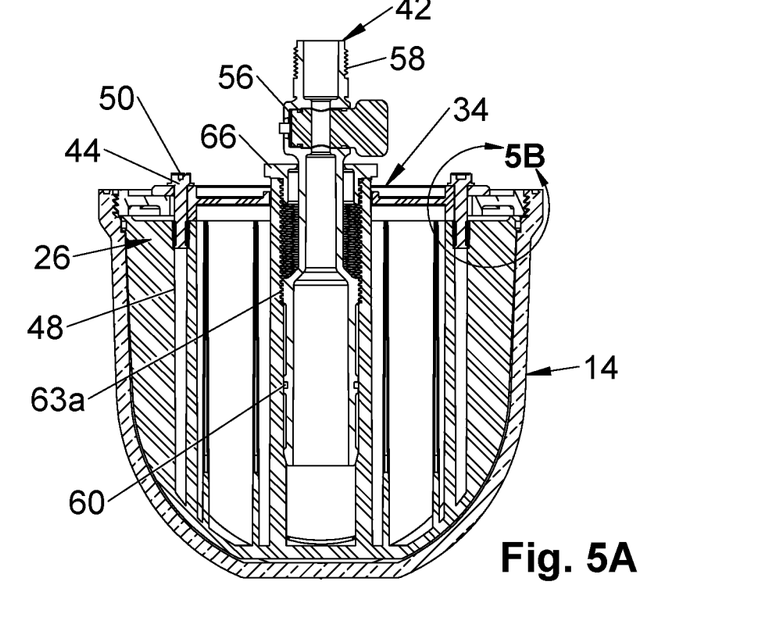
FIG. 5A is a variation of the cross-sectional view taken along section 2A-2A of FIG. 3 with a head of a threaded fastener urging the extractor plate against the plug.
Figure 5B:
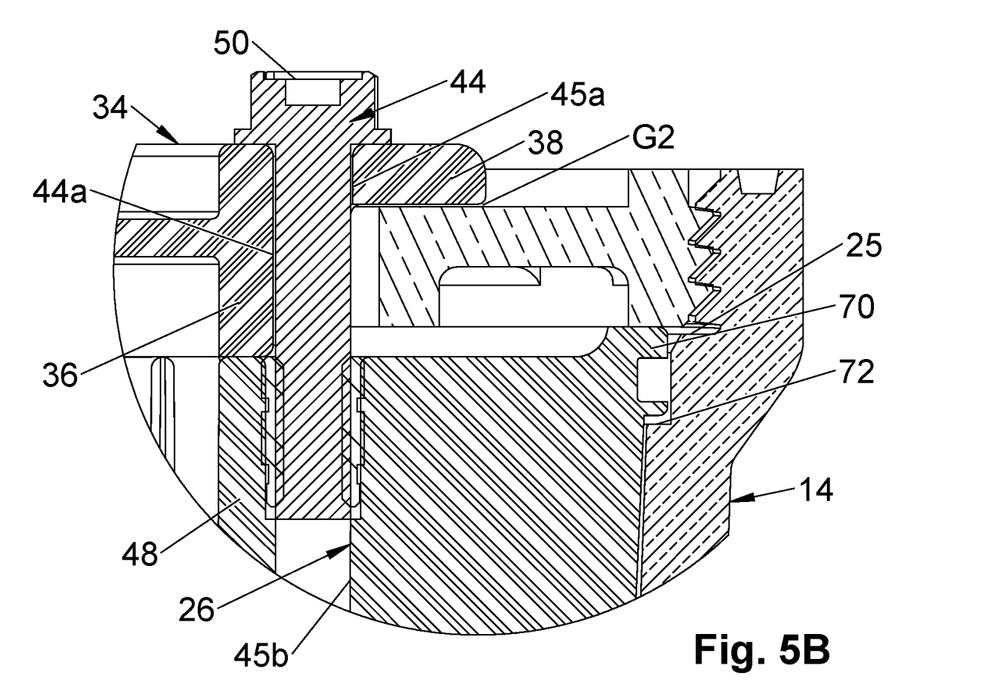
FIG. 5B is an enlarged cross-sectional view taken along Section 5B of FIG. 5A.

While the retaining ring 30 moves the extractor plate 34 across the axial distance G1, the weight of the extractor plate 34 may cause some frictional resistance to the relative rotation of the retaining ring and extractor plate, with the resistance depending on how gravity forces the parts together. In the orientation of FIGS. 5A, 5B, the entire weight of the extractor plate will provide rotational resistance. If the parts are rotated one quarter turn or more in either direction from that shown in FIGS. 5A, 5B, then gravity make the weight of the extractor plate 34 largely neutral. If the parts were rotated a half turn from the orientation shown in FIGS. 5A, 5B, then gravity would urge the extraction plate against the fastener heads 50 and the weight of the extraction plate should pose no hinderance to movement of the retaining ring.

The ability to rotate the retaining ring 30 without moving the plug 26 is believed to be useful if the retaining ring is stuck to the port 16, as for example, if the port threads 29b above the retaining ring were damaged so as to inhibit unscrewing of the retaining ring, or if debris got between the retaining ring threads 29a and the port threads 29b to jam them, or if one or both of the threads 29a, 29b are otherwise damaged or jammed so as to make removal of the retaining ring difficult. The axial movement of the retaining ring without moving the plug axially, allows all of the mechanical advantage of the threads 29a, 29b to be directed solely to loosening a jammed retaining ring. The high mechanical advantage of the preferred ACME or buttress threads 29a, 29b should make it easier to dislodge the plug 26 from the fitting recess 22. The increases strength of those thread types should allow repeated use of the plug and port without damage to the threads 29a, 29b. After the retaining ring causes the extractor plate 34 to begin to move the wedge-shaped plug 26 out of the wedge-shaped recess formed by fitting walls 24a, 24b, the mechanical advantage of the threads 29 must move both the jammed threads 29 and the stuck plug 26. The slight gap G2 between the bottom of the extractor plate flange 38 and the top portion of the inner periphery of the retaining ring that is overlapped by the extractor plate flange, may provide the axial motion suitable for breaking free the retaining ring before beginning to move the plug 26. In short, the gap G2 can allow the regaining ring to sequentially start the retaining ring threads 29 rotating relative to each other before starting the plug 26 moving axially. A gap G2 of 0.001 to 0.1 inches along port axis 17 is believed preferable for the combined gap G1+G2, but larger distances of 0.001 to 0.5 inches are believed suitable. Larger gaps are usable, but less desirable because they require a long, threaded engagement of threads 29 and result in a longer length of center protrusion 36 which results in a longer center support for extractor plate and may make the extractor plate more flexibly supported.

The retaining ring 30 maintains the sealing device 26 in place during pressure testing. The fitting 10 and retaining ring 30 are advantageously made of a polymer, preferably ABS or PVC plastic, although other materials could be used, including metal and cast iron. The retaining ring 30 could be made of metal. The plug 26 may be also be made of ABS OR PVC plastic, but is preferably made of polypropylene or polyethylene which cannot be bonded by typical plastic pipe adhesive so as to avoid inadvertently gluing the devices to the fitting 10.

The fitting 10 preferably comprises a cylindrical tube extending along longitudinal fitting axis 14 with the opening or port 16 opening onto a side of the fitting. The port 16 has a circular interior portion, but various exterior shapes could be used. The port 16 is advantageously, but optionally formed in a cylindrical part so the fitting 10 generally has two cylindrical tubes intersecting at right angles. The depicted embodiment is a T fitting, but the port 16 can be located on an elbow fitting, a dead-end fitting, an angle fitting, or other pipe joints.

The fitting 10 has a fitting recess 22 extending around the inner circumference of the flow path through the fitting 10 and opening into the port 16, although depending on how one views the intersection of the port and flow path through the fitting, the fitting recess 22 could be viewed as encircling only a portion of the flow path. Preferably, though, it is viewed as encircling the flow path and extending around the entire circumference of the flow path. The fitting recess is configured and located to receive the devices 26, 28, and the plug 26 preferably forms a fluid tight seal with the fitting recess 22. Since the fitting recess 22 opens into the port 16 the shape of the fitting recess will typically blend together or overlap with part of the port 16.

The fitting walls 24a, 24b are flat, having a generally V-shape or horseshoe shape with an elliptical opening through which the fluid flows along axis 14. The shape of the elliptical opening varies with the inclination of the fitting walls 24 relative to the flow path 14. The inclined fitting walls 24 are flat to form a sealing surface with the plug 26 as discussed above.

The fitting walls 24a, 24b at the top of the recess 22 by port 16 are preferably spaced apart a distance that is at least large enough to allow passage of a ball or sphere that is about ½ inch smaller than the nominal diameter of the pipeline to which the fitting 10 is connected. The diameter of the interior walls 18 adjacent the port 16 preferably have the same interior diameter as that of the pipeline. The walls at the bottom of the fitting recess, opposite the port 16, are spaced apart a distance sufficient to allow the described ball to enter and pass through the flow path through the fitting and enter the pipeline. The inclination of fitting walls 24a, 24b can be varied to accommodate varying degrees of wedging with the mating faces 28a, 28b of the plug 26, making it more easy or difficult to insert and remove the plug because of friction and wedging. Fitting walls 24 inclined at an angle of about 15 degrees to a plane orthogonal to the longitudinal fitting axis 14 during use, are believed suitable.

The port 16 is preferably larger than the pipe diameter so the tops of the walls 24 at the circular port 16 form chords across the circular port. The tops of the walls 24 form opposing flats 76a, 76b having a curved side bounded by the port 16 and a flat side bounded by the inclined fitting walls 24a, 24b. Around the periphery of the flats 76 is the annular shoulder or ledge 25 that is slightly offset outward along axis 17 and flats 76. The first shoulder 25 is preferably generally coplanar with the flats 76.

Referring to FIGS. 1-3, in use the test plug 26 is inserted into the port 16 of fitting TO which is fastened to a pipeline. Advantageously, the extractor plate 38 is fastened to the plug 26 and retaining ring 30 is captivated between the extraction plate 34 and the plug 26 when the retaining ring threadingly engages the threads 29b on port 16. Retaining ring 30 screws onto fitting 10 to adjust the distance the plug is inserted and wedged between the fitting walls 24a, 24b to stop leakage. A tightening wrench, such as a spanner wrench with members engaging two wrenching surfaces 32 on diametrically opposite sides of the retaining ring may be used. Shoulders 25, 72 limit the insertion of the plug 26, but that is optional. A water hose bib (or air connection) can be connected to threads 58 to provide water (or air) for pressure testing the pipeline, or alternatively to guide off drain water (or air) after testing is stopped. If air is used the garden hose threads are replaced with a suitable connector, preferably of a quick connect type that uses rotary motion or an axial motion followed by a partial rotation.

After pressure testing is completed, the testing device of plug 26 is removed by removing retaining ring 30, as needed. A spanner wrench engages two recesses 32 on opposing sides of the retaining ring to unthread the ring until it can be rotated by hand. The retaining ring 30 rotates relative to the non-rotating plug 26 and extractor plate 38 which are prevented from rotating by the fitting walls 24 engaging the plug faces 28. When the retaining ring is completely unthreaded, the retaining ring, plug and extractor plate may be manually removed as a unit.

The fitting 10, plug 26, the body of plug, rotary 84 and sealing device 28 are each separate parts connected together for use and each part is preferably molded of a suitable polymer material. ABS or PVC plastic is believed suitable. As used herein, "integral" means that each individual part is molded entirely at the same time, with all portions molded simultaneously rather than molding parts separately and joining them together later by adhesives or melting or other fastening mechanisms.

The retaining ring 30 holds the wedge-shaped plug 26 in sealing engagement with the wedge-shaped recess formed by the walls 24a, 24b of the fitting 10. Thus, movement of the plug 26 along the port axis 17 in a direction out of the port can break the fluid tight seal needed between the mating plug faces 28a, 28b and fitting walls 24a, 24b, and sealing rings 52 during testing. The amount of motion along port axis 17 that is needed to relieve the force holding the plug 26 in the recess between recess walls 24a, 24b is believed to be about 0.02 to 0.05 inches (0.5 to 1.5 mm).

As seen in FIGS. 2 and 5, a central protrusion 36 extends from the inner portion of the extractor plate 34 to the plug 26, with fasteners 44 connecting the extractor plate to the plug so the plug and extractor plate move along the port axis 17 together and rotate about the port axis together. The connection between the extractor plate and plug occurs through the center opening 33 of the retaining ring 30 so the retaining ring can rotate around port axis 17 relative to the plug and extractor plate. Threaded fasteners 44 are preferred for connecting the extractor plate to the plug because when they are tightened to clamp the center flange 36 of the extractor plate 34 against the plug 26 (FIGS. 5A, 5B), the extractor plate flange 38 has a predetermined gap G2 between the flange 38 and the adjacent surface of the retaining ring 30. But if the gap is too small because of manufacturing tolerances, the threaded fasteners 44 may be loosened so the heads 50 are above the top surface of the extractor flange 38 (FIGS. 2A, 2B) and thus the gap G2 can be increased by using the fastener heads 50 to create an additional axial gap G1. The threaded fasteners 44 thus provide some adjustment capability for the maximum axial gap G1+G2.

Preferably, the center protrusion or flange 36 rests directly against the top, center portion of plug 26 at a location that outside the flow passage through the fitting 14 and at the top of the plug 26 so that the connection between the flange 36 and plug 26 does not contribute to leakage across the plug recess 22. It is thus preferred that the connection between the flange 36 and plug 26 occurs at a location that is sealed from leaks around the valve body. A tight connection between the extractor plate 34, its center protrusion or flange 36 and the plug 18 is preferred so there is no movement or play along the port axis 17 in the direction toward that plug and into the port recess 22. Connections other than a plurality of threaded fasteners holding two separate parts together can be used, especially if molding tolerances or manufacturing tolerances are tightly maintained. Thus, the central protrusion such as boss or flange 36 may itself form the connection with the top of the plug 26, as for example, by a threaded connection, a bayonet lock connection, by a snap lock connection or male projections engaging female recesses. These form removable connections. Alternatively, the central protrusion or flange 36 may be permanently fastened to the plug 26, as for example, by an interference fit connection, an adhesive connection, a heat formed connection or an ultrasonically welded connection. If the plug 26 is a separate part from the central protrusion, boss or flange 36, then some motion along port axis 17 and distance G1 is permitted as discussed herein, so there are operational advantages using multiple parts. Also, if the connection between the plug and retractor plate is removable, the retaining ring can be replaced if it is damaged.

The plug 26 and retaining ring 30 may be configured to engage port threads 29b on preexisting fittings 14. Thus, the plug 26, extractor plate 34 and retaining ring 30 may be used with preexisting fittings 14 to pressure test preexisting pipelines. The plug assembly of the plug 26, retaining ring 30 and extractor plate 34 may not just be manually manipulated as a single unit, but may be sold as a single, separate unit from the fitting 14. After testing is completed, a cover may be used to close port 16, and as desired an annular plug encircling the flow path and configured to fill the fitting recess 22 and allow the flow path to pass through the hole formed by the annular plug, may be inserted into the recess 22, with a circular cover engaging the port threads 29b to hold the hollow plug in place. Such port covers or closures, and such hollow plugs are known in the art and not described herein.

The plug assembly with the plug 26 and extractor plate 34 holding the retaining ring 30 between the plug and extractor plate, may be sold alone as described, but that assembly may also be sold as a kit with one or more fittings 14.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The above description is given by way of example, and not limitation. Given the above disclosure, one skilled in the art could devise variations that are within the scope and spirit of the invention, including various ways of connecting the extractor plate to the plug so they move together along the port axis and rotate together about the port axis. Further, the various features of this invention can be used alone, or in varying combinations with each other and are not intended to be limited to the specific combination described herein. Thus, the invention is not to be limited by the illustrated embodiments.

What is claimed is:

1. A plug assembly for pressure testing a pipe line with a fitting connected thereto, the fitting having a longitudinal fitting axis and a circular port centered on a port axis orthogonal to and intersecting the longitudinal axis, the plug assembly comprising:
   a plug removably insertable within the circular port of the fitting, the plug having a top end encircled by a circular top flange that extends away from the port axis, the plug having a plug fluid passage in fluid communication with a valve to selectively block fluid flow through the plug fluid passage;
   a retaining ring mountable within the circular port of the fitting, the retaining ring defining a center opening; and
   an extractor plate mechanically connected to the plug through the center opening of the retaining ring, an outer periphery of the extractor plate extending radially over an inner periphery of the retaining ring to capture the retaining ring between the extractor plate and the plug, the extractor plate having a central protrusion with an axial length along the port axis to form a gap along the port axis between the retaining ring and the extractor plate, wherein the gap is sufficient to allow rotation of the retaining ring about the port axis relative to the plug and the extractor plate.

2. The plug assembly of claim 1, wherein the retaining ring is configured to be mechanically attached to the plug, and when the retaining ring is unfastened, the plug is configured to be pulled in an axial direction along the port axis to extract the plug from frictional engagement with the fitting.

3. The plug assembly of claim 1, wherein the retaining ring has external retaining threads configured to threadedly engage internal port threads of the circular port, wherein the gap is not larger than axial travel of the threaded engagement of the external retaining threads of the retaining ring with the internal port threads of the circular port.

4. The plug assembly of claim 1, wherein the circular port includes external threads on an outside thereof configured to engage internal threads on a skirt extending from an outer portion of the retaining ring.

5. The plug assembly of claim 1, wherein the plug has inclined plug faces on opposing sides of the plug.

6. The plug assembly of claim 5, wherein, when the plug is inserted inside the circular port of the fitting, the inclined plug faces of the plug seal against respective fitting walls of the fitting to provide a fluid tight seal.

7. The plug assembly of claim 1, wherein the retaining ring is a spanner ring.

8. The plug assembly of claim 1, wherein the extractor plate is configured to be threadedly fastened to the plug and not to the retaining ring such that the retaining ring rotates about the port axis relative to the plug and the extractor plate.

9. The plug assembly of claim 1, wherein an outer periphery of the retaining ring includes a plurality of wrenching surfaces to aid in gripping and turning the retaining ring with a hand tool.

10. The plug assembly of claim 9, wherein the outer periphery of the extractor plate comprises an annular flange extending radially outward from the port axis a distance beyond the center opening of the retaining ring but not extending radially outward far enough to prevent the plurality of wrenching surfaces from being used to engage the hand tool to unfasten the retaining ring.

11. The plug assembly of claim 10, wherein the annular flange is configured to fit inside and pass through the center opening of the retaining ring.

12. A pressure testing assembly for pipelines including a fitting, the pressure testing assembly comprising:
a plug removably insertable within the fitting;
a retaining ring mountable within a port opening of the fitting, the port opening defining a port axis, and the retaining ring defining a center opening; and
a connection member that mechanically connects the retaining ring to the plug through the center opening of the retaining ring, an outer periphery of the connection member extending radially over an inner periphery of the retaining ring to capture the retaining ring between the connection member and the plug, the connection member having a central protrusion with an axial length along the port axis to form a gap along the port axis between the retaining ring and the connection member, wherein the gap is sufficient to allow rotation of the retaining ring about the port axis relative to the plug and the connection member.

13. The pressure testing assembly of claim 12, further comprising a tube extending through the center opening of the retaining ring and the connection member, the tube having an exterior end and an opposing end opening internally to the plug, with a valve on an externally accessible end of the tube, the valve comprising a rotating valve that is manually operated to selectively block or allow fluid flow through the plug.

14. The pressure testing assembly of claim 12, wherein an outer periphery of the retaining ring includes a plurality of wrenching surfaces to aid in gripping and turning the retaining ring with a hand tool.

15. The pressure testing assembly of claim 14, wherein the wrenching surfaces comprise a plurality of recesses that extend along the port axis and have a closed bottom, sidewalls, and an open top facing away from the plug, the plurality of recesses extending around a circumference of the retaining ring between the outer periphery and the center opening of the retaining ring.

16. The pressure testing assembly of claim 14, wherein the plug includes inclined plug faces on opposing sides of the plug that each align with a different one of respective fitting walls to block fluid flow through the fitting when the plug is inserted.

17. A method of making a plug assembly for a plug used to block a fluid flow path through a fitting, the method comprising:
placing a retaining ring on the plug, the plug defining a central axis, and the retaining ring defining a center opening; and
attaching a connection member to the plug through the center opening of the retaining ring such that the plug and the connection member are fastened a predetermined maximum distance apart along the central axis and move together along the central axis as a single unit;
wherein the predetermined maximum distance places an outer flange of the connection member a distance G, the outer flange overlapping a portion of an inner periphery of the retaining ring such that the distance G is above a top surface of the overlapped portion of the inner periphery of the retaining ring; and
wherein the distance G is measured along the central axis and is sufficient to avoid clamping between the connection member and the retaining ring and to allow the retaining ring to rotate about the central axis relative to the plug and the connection member.

18. The method of claim 17, wherein the distance G is between 0.001 and 0.4 inches.

19. The method of claim 17, wherein the connection member includes a protrusion configured to encircles the central axis, the protrusion extending to the plug and being fastened thereto.

20. The method of claim 19, wherein the central protrusion has a length along the central axis that is greater than the distance between a circular top of the plug and the top surface of the overlapped portion of the retaining ring by the distance G.

* * * * *